M. CHRISMAN.
Hedge-Trimming Shears.

No. 156,073.    Patented Oct. 20, 1874.

Witnesses.
E. H. Bates
Chas. B. Stele

Inventor.
M. Chrisman
Chipman Hosmer & Co
Attys

UNITED STATES PATENT OFFICE.

MICHAEL CHRISMAN, OF ALPHA, MISSOURI.

IMPROVEMENT IN HEDGE-TRIMMING SHEARS.

Specification forming part of Letters Patent No. 156,073, dated October 20, 1874; application filed March 29, 1873.

*To all whom it may concern:*

Be it known that I, MICHAEL CHRISMAN, of Alpha, in the county of Grundy and State of Missouri, have invented a new and valuable Improvement in Shears; and I do hereby declare that the following is a full, clear, and exact description of the construction and operation of the same, reference being had to the annexed drawings making a part of this specification, and to the letters and figures of reference marked thereon.

Figure 1:
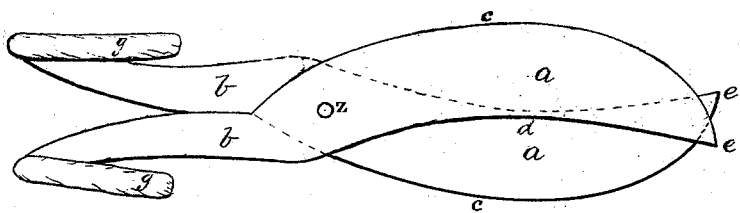
Figure 2:
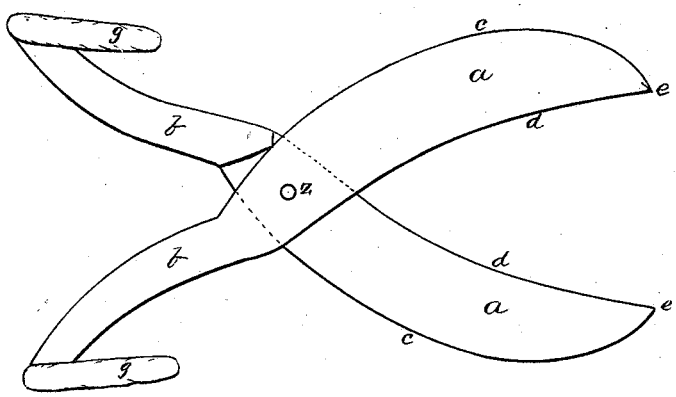
Figure 3:
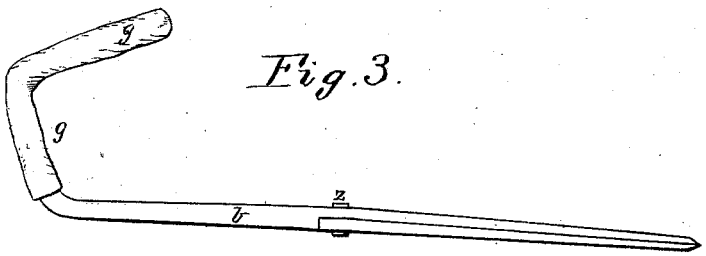

Figure 1 of the drawings is a representation of a view of my shears closed. Fig. 2 is a view of the same open. Fig. 3 is a view of one blade.

This invention has relation to means for trimming osage-orange or other hedge fences; and it consists in the construction and novel arrangement of the blades and handles composing the shears, hereinafter described.

In the accompanying drawings the letters *a a* indicate the blades of the shears. These blades are made broad and flat, as indicated in the drawings, for purposes of strength, and to afford assistance to the operator in trimming off inequalities on a plain hedge-wall. With a similar object in view the shanks *b b* of the blades are extended in line with the surfaces of the blades, which are toward the plants in trimming. The outer edges *c* of the blades, as well as the cutting-edges *d*, are curved inward to the points *e*, which cross each other in making a full cut, inclosing the twigs and preventing them from slipping off the cutting-edges. From the ends of the shanks the handles *g* extend outward at right angles thereto, and are then reversely bent forward toward the blades, extending for a certain distance parallel or nearly so with the shanks, and terminating. The shears are pivoted together at *z*, and the handles are designed, usually, to be covered with wood or leather.

This arrangement of the handles enables the operator to cut plane and other faces on the hedge without carrying his hands in among the twigs or foliage. Further, he can operate nearly opposite the shears without stooping, and will not tire so readily in the work. A horizontal plane can be trimmed at a height that it would be impossible to reach without handles arranged in this manner, while the operator is standing on the ground.

What I claim as new, and desire to secure by Letters Patent, is—

The hedge-trimming shears having the flat blades *a*, with the shank *b* thereof in line with said blades, and the handles *g* bent parallel with each other, or nearly so, outward, and reversely bent forward toward the blades, as shown and described.

In testimony that I claim the above I have hereunto subscribed my name in the presence of two witnesses.

MICHAEL CHRISMAN.

Witnesses:
 C. I. WOODS,
 J. B. FREEMAN.